3,657,191
Patented Apr. 18, 1972

3,657,191
PROCESS FOR THE MODIFICATION OF TERMINAL GROUPS OF POLYESTERS
Rudolf Titzmann, deceased, late of Bobingen, Germany, by Hella Titzmann, nee Hahner, Bobingen, Klaus Titzmann and Jörg Titzmann, Frankfurt am Main, and Michael Titzmann, Munich, heirs, and Hans Thaler, Strassberg, and Josef Walter, Bobingen, Germany, assignors to Farbwerke Hoechst Aktiengesellschaft vormals Meister Lucius & Bruning, Frankfurt am Main, Germany
No Drawing. Filed June 9, 1970, Ser. No. 44,905
Claims priority, application Germany, June 9, 1969, P 19 29 149.7
Int. Cl. C08g 17/14
U.S. Cl. 260—75 T                        4 Claims

ABSTRACT OF THE DISCLOSURE

The present invention relates to a process for the manufacture of linear polyesters having an improved stability with respect to compounds with active hydrogen. Polyesters of this type are obtained by reacting polyesters with ethylene carbonates or monofunctional glycidyl ethers. The reaction is first carried out within a temperature range lying 10° to 60° C. below the softening point of the polyester and is then terminated during the melting- and melt-spinning process.

---

The present invention relates to a process for the modification of terminal groups of polyesters.

Polyester fibers, filaments, monofils and other shaped articles are used on account of their high strength and their good dimensional stability either as such or in combination with other plastics or elastomers in articles which have found various industrial applications.

When shaped articles of polyesters or the corresponding technical articles made therefrom are subjected during practical application to greater strain, especially to higher temperatures and to the prolonged action of moisture, alcohols, acids or amines, there occur hydrolytic or alcoholytic, acidolytic or aminolytic degradation processes which substantially diminish the molecular weight of the polyester and, thereby, its strength and may lead eventually to the total destruction of the polyester.

It is known that the extent of the damages sustained depends especially on the content of free carboxyl terminal groups of the polyester. The higher the content of COOH terminal groups of the polyester, the greater the susceptibility of the polyester to undergo such a degradation.

Methods for the manufacture of polyesters having a reduced content of COOH terminal groups have already been described. In these methods, a polyester having a mean molecular weight which has been condensed in the melt, is used as the starting substance, the polyester is allowed to solidify, it is comminuted into a granular product which is finally condensed in the solid state (i.e. under especially mild conditions) to the desired degree of condensation at temperatures far below the melting point. In this method the formation of free carboxyl terminal groups which is due to side reactions can only occur in a lesser degree, and the polyester contains fewer COOH terminal groups (measured in mval./kg. polyester) then when it had been obtained only by poly-condensation in the molten state. In the process of remelting and spinning the granules into filaments, however, the COOH content is again increased by a thermal degradation. Thus it is not possible with this method to manufacture polyester filaments, fibers or monofils having an extremely low content of COOH terminal groups. Attempts have, therefore, also been made to manufacture polyesters having an especially low content of free COOH terminal groups by closing the carboxyl groups which are formed during the manufacture by chemical reaction with suitable substances. As closing agents there are especially used those which can combine additively with free COOH groups. Compounds of this type are, for example, diazomethane, monofunctional epoxides, especially in the form of glycidyl ethers, isocyanates, acetals or imines.

In most of the known processes the closing agent is added at a relatively early period during the ester interchange reaction or during the polycondensation in which case, however, the substances which are effective as closing agents do not only react with the terminal groups but are also incorporated into the polyester chain in statistical distribution. This method is not advantageous for high-grade polyesters to be used in industry since the symmetry of the polyester chain is disturbed and the static and dynamic properties in the longitudinal and transverse direction of the filaments are impaired.

It is likewise known to carry out the reactions of closing the terminal groups with the polyester in the molten state when the condensation is complete.

However, if the manufacture of filaments, fibers or monofils dispose at the place where the spinning is carried out only of a polycondensation product which is in the form of solid granules or which has been cut into chips, the aforesaid process can only be carried out with a considerably increased expenditure on apparatus or while obtaining an incomplete result with respect to the closure of the COOH terminal groups and, in any case, only with an impairment of the quality of the polyester. The conversion of the reactive component with the COOH terminal groups requires a certain minimum period which is composed of the time necessary to obtain an intimate and uniform mixture and the time required for the chemical reaction proper.

When processing the polyester granules into filaments, fibers or monofils, spinning is generally carried out either by means of a spinning grid or an extruder. When working according to the grid spinning process, intermixing of the melt with the reactive substance is not possible at all unless the melt is subsequently conveyed to the spinning pump and to the spinneret by means of an additional mixing plant. The extruder melts the dried granular product and conveys the melt to the spinning aggregate by means of a screw. Since the polyester melt, as is well-known, is subject to a more or less intense thermal degradation in dependence on the time and the temperature, especially when it is not in vacuo, it is endeavored to maintain the period between melting and the spinning process proper and, thereby, the length of the conduits from the extruder by way of the spinning pump to the spinnerets as brief as possible. When the reactive substance, after the polyester mass has melted, is metered into the melt in or after the extruder, the residence time from the moment of the supply of the reactive substance until the formation of the filament sets in normally does not suffice to allow as substantial and homogeneous a reaction as possible to take place between the COOH terminal groups and the reaction substance. It is, therefore necessary additionally to install a mixing aggregate after the extruder which, on the one hand, intimately and uniformly mixes the very viscous melt with the reactive substance and, on the other hand, correspondingly increases the residence time of the melt until it reaches the spinneret.

However, a very uniform distribution can also be attained by intimately mixing the granular product with the reactive substance already prior to feeding the granules to the extruder (for example, by tumbling or stirring). In this case, the mixing aggregate might be dispensed with, however, measures have to be taken to maintain a correspondingly long reaction period. This can also be attained by greatly reducing the spinning rate as compared with normal spinning or by an extension of the conduits from the extruder to the place of spinning. Both measures entail an undesirably high degradation; the former measure is, moreover, uneconomic. Furthermore, it has been found that, although the COOH content determined by titration may be low when working according to this process, the stability of these filaments with respect to hydrolysis or aminolysis, however, does not meet the requirements. This can only be explained by an inhomogeneous closure of the terminal groups. An entirely uniform distribution of the reactive substance throughout the melt, however, can take place only within very narrow limits on account of the aforementioned degradation.

Now we have found a process for the manufacture of linear polyesters having modified terminal groups and an improved stability with respect to compounds with active hydrogen by reacting the polyesters with ethylene carbonates or mono-functional glycidyl ethers in amounts ranging from 0.1% to 10% by weight, calculated on the polyester, which comprises carrying out the reaction in a first step within a temperature range lying 10° to 60° C., preferably 15° to 40° C., below the softening point of the polyester and, after melting the polyester in a second step, melt spinning it in known manner and, thereby, terminating the reaction.

In a preferred modification of this process, the first step of the conversion of the polyester with the ethylene carbonate or the monofunctional glycidyl ether is carried out within a temperature range lying 10° to 60° C. below the melting point of the polyester following the drying process of the polyester.

In a further preferred modification the first step of converting the polyester with the ethylene carbonate or the monofunctional glycidyl ether is carried out following a postcondensation of the polyester in the solid state.

The process of the invention enables the manufacture of filaments, fibers, monofils and other shaped articles which have a very good stability to hydrolysis or aminolysis also with the use of solid polyester granules as the starting material. This process can be carried out without increased expenditure on apparatus and avoids the aforedescribed degradation which is due to an exceedingly long residence time of the melt at an elevated temperature. The process, moreover, unexpectedly yields materials which are far superior with respect to their stability to hydrolysis, aminolysis, etc. to those materials which have been obtained by the processes described above. When reacting the polyester with the substance closing the carboxyl groups, the reactive substance is metered into the hot granular product and the mixture is maintained at the reaction temperature for a definite period. The reaction can also be carried out while stirring, rotating, shaking or tumbling the mixture. In this process, the reactive substance must diffuse into the interior of the granular grains before the chemical conversion at the COOH terminal groups of the polyester can proceed.

Thus the reaction period required altogether is composed of the sum of the diffusion and the reaction period. It was to be expected, however, that the diffusion would proceed very slowly especially when taking into consideration that in high-polymeric organic compounds diffusion processes can practically only proceed in the non-crystalline ranges, while the polyester granules possess, after the drying process or even more so after a post-condensation in the solid phase, such as high degree of crystallinity that the drying process in which water diffuses out or the post-condensation process in which, for example, glycol diffuses out, is slowed down more and more and practically ceases after a certain time. In the process of the present invention there must, in a reverse direction, diffuse even larger molecules than water or glycol into the crystalline polyester. It was not to be expected, therefore, that diffusion and reaction would proceed within a relatively short time, the required total period amounting only to several minutes to a few hours depending on the temperature, the size of the polyester grains, the amount and reactivity of the closing agent.

The process can industrially be carried out following a discontinuous drying or post-condensation in the solid phase in known apparatuses, for example in eccentric tumbling driers or following a continuous drying process or a condensation in the solid phase, for example in rotary tubular kilns, heated screw mixers or other apparatuses suited therefor.

As closing agents there may be used monofunctional compounds having a direct or masked oxirane ring in the molecule, such as cyclic ethylene carbonates corresponding to the formula

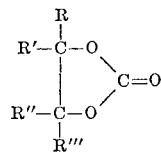

and glycidyl ethers corresponding to the formula

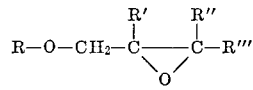

in which R, R', R" and R'" represent hydrogen or aliphatic hydrocarbon radicals containing 1 to 18, preferably 1 to 10 hydrocarbon atoms, cycloaliphatic, aromatic or heterocyclic radicals. There may advantageously be used, for example, ethylene carbonate, methyl ethylene carbonate, 1,1,2,2-tetramethyl ethylene carbonate, 1,2-diphenyl-ethylene carbonate, iso-nonyl-glycidyl ether, stearyl glycidyl ether, tricyclo-decylmethylene glycidyl ether, phenyl glycidyl ether, p-tert. butyl-phenyl glycidyl ether, o-decylphenyl glycidyl ether.

The required amount of the reactive closing agent depends on the amount of the polyester employed, its content of free COOH terminal groups, the reactivity of the closing agent used and on its molecular weight. In order to increase the reaction speed in the case of slowly reacting closing agents, it is also possible to use a considerable excess amount of closing agent. Calculated on the polyester, the amounts of closing agent applied may be within the range of from 0.1% to 10%, preferably 0.5% to 3.5%.

The range of the reaction temperature is relatively narrow; too low temperatures required too long resisdence times, whereas in the case of too high temperatures in the vicinity of the softening point there occurs sticking of the polyester particles to one another which prevents the reaction to be completed in a homogeneous manner. The conversion is, therefore, carried out within a temperature range lying 10° to 60° C., preferably 15° to 40° C. below the softening point of the polyester.

With temperatures lying within the range of 10° to 60° C. below the softening point of the polyester, the reaction periods required range from several minutes to several hours, depending on the size of the granular product, its crystallinity, the content of COOH terminal groups of the starting product, the temperature and the reactivity of the reactive substance.

The smaller the grain size of the polyester particle, the more rapidly diffusion and reaction proceed. However, it is not necessary to depart from the pulverulent polyester. Even when departing from the conventional shaped granular products, for example from cylindrical small rods having a diameter of 2 mm. and a length of 3 mm., or from small square chips (6 x 6 x 2 mm.), there are only required total periods of from 1 to 5 hours at, for example, 235° C. to obtain a substantially complete closure of the carboxyl groups, depending on the amount and reactivity of the closing agent. However, it is not necessary to achieve the complete conversion of all free COOH terminal groups in this process step since the residual reaction can be carried out upon melting and spinning the granular product when there is still present a sufficient excess amount of closing agent which has been absorbed by the polyester.

The conversion reaction can be carried out under any desired pressure which is advantageous with respect to the apparatus used. When operating in hermetically closed apparatuses following the drying process or the post-condensation in the solid phase of the granular product, the reactive substance is advantageously added in vacuo to facilitate evaporation of the substance, which enables the reactive substance particularly well to come into uniform contact with all solid polyester particles and whereby the mixing period may be shortened. However, it is also possible to meter in the reactive substance under atmospheric pressure or under superatmospheric pressure, in which case it is advantageous to hold off atmospheric oxygen from the hot granular product to avoid that the polyester or the closing agent sustain oxydate damages at the high temperature. In this case, the reaction has to be carried out in an inert gas atmosphere, for example under nitrogen or under $CO_2$.

The term "polyester" includes all linear polyesters on the basis of dicarboxylic acids or the derivatives thereof and dihydric alcohols. The dicarboxylic acids which may advantageously be used are, above all, terephthalic acid, isophthalic acid, sulfo-isophthalic acid, diphenyl-p-p′-dicarboxylic acid or naphthalene dicarboxylic acids. The carboxylic acids may be used as such or in the form of their esters with monohydric alcohols or phenols. As dihydric alcohols there may be used with special advantage di-primary alcohols such, for example, as ethylene glycol or the higher homologs thereof containing 3 to 10 carbon atoms in the chain, for example 1,4-dimethylol cyclohexane or 2,2-dimethylpropanediol-1,3. There may also be used polyesters from combinations of several dicarboxylic acids or several dihydric alcohols in the form of copolyesters.

There are preferably used polyesters 75% of whose acid component consists of units of terephthalic acid and at least 75% of its diol component consists of ethylene glycol.

After trans-esterification and polycondensation have been carried out with the addition of known trans-esterification and polycondensation catalysts, if desired with the concomitant use of stabilizing agents, matting agents, dyestuffs, light stabilizers and other agents, the melt is worked up into granules in the conventional manner. The granules are dried according to known methods and are then intimately mixed with the corresponding amounts of closing agents at suitable temperatures and allowed to react over the period required.

Another variant of the process consists in interrupting the condensation in the melt at a medium degree of condensation, to carry out granulation and to impart a higher degree of condensation to the granular product according to known processes in the solid phase in vacuo or in an inert gas stream, for instance also in a fluidized bed. Following the condensation in the solid phase, the reactive substance can be added to the product—in most cases in the same temperature range in which condensation had been carried out—and the reaction mixture is allowed to react over the period desired. A simple possibility of carrying out the process in this manner consists in effecting the post-condensation of the polyester granules in eccentric tumbling driers in vacuo within a temperature range lying 10° to 60° C. below the softening point of the polyester and then, after the condensation is complete and after the vacuum conduit has been closed, to spray the reactive substance into the evacuated drier at the same temperature of the solid material as during the condensation reaction and to carry out the reaction in the solid phase at the same temperature as the condensation in the solid phase. After being filled into intermediate containers, the granular product can be spun directly.

However, the reaction can also be carried out in the same eccentric tumbling drier after the vacuum has been filled with inert gases, such as $CO_2$ or $N_2$. Instead of the eccentric tumbling drier, in which the reaction is carried out discontinuously as a batch porcess, it is possible, with the same good result, to employ continuously operating drying installations or installations for carrying out the condensation in the solid phase of the conventional type and, following thereafter, to carry out the reaction in vacuo or under normal pressure or even under superatmospheric pressure.

The filaments, fibers or monofils obtained in accordance with the present invention can be processed into a variety of finished articles, such as yarns, twists, woven or knitted fabrics, ropes or fleeces. They may likewise be used as reinforcing materials in combination with plastics materials or synthetic or natural elastomers, for example in tyres, belt conveyors, V-belts, driving belts, tubes or coated fabrics. The melt obtained from the polyester granules which have been worked up in accordance with the present invention may also be processed into other shaped articles, for example into sheets. The above enumeration is not complete; it shall only point out the valuable industrial uses of the shaped polyesters which are stable to hydrolysis, aminolysis, alcoholysis and acidolysis, i.e. to compounds with active hydrogen.

The terms "SV" and "COOH content" cited in the examples following hereunder are defined as follows:

The term "SV" means 1000 times the value of the specific viscosity $$SV = 1000 \cdot (\eta_{rel} - 1)$$

The relative viscosity $\eta_{rel}$ is the proportion of the flow period of a solution of 0.25 gram polyester in 25 ml. of solvent mixture of phenol and tetrachloroethane (3:2 parts by weight) to the solvent mixture, measured at 25° C.

The determination of the content of free COOH terminal groups is carried out in a manner analogous to the method applied by Maurice and Huizinga (Anal. Chim. Acta 22, 1960, 363–368), however, the ethanolic KOH solution prescribed in this literature reference is replaced by an aqueous NaOH solution. The content of COOH terminal groups is expressed in mval. COOH/kg. polyester.

The breaking strength is measured with the aid of the device Zwick Z 1.1 G for measuring the breaking strength at a gage length of 100 mm. and a crosshead speed of 380 mm./min. at 22° C. and 65% relative air moisture.

EXAMPLE 1

Dimethyl terephthalate and ethylene glycol were re-esterified, in known manner, in the presence of calcium acetate as the catalyst and, after the addition of antimony trioxide, condensed in vacuo to yield a polyester having a SV of 950, the polyester was discharged in the form of a strand and the 2 mm. thick strand was cut into 3 mm. long small pieces. The COOH content was 23.6 mval./kg. 40 kg. of this granular product were charged to an eccentric tumbling drier (capacity: 100 l.) and dried in vacuo, while tumbling the product and gradually increasing the temperature up to 160° C. After the drying process was complete, the temperature of the product was increased to 235° C., and the granular product was condensed under 0.1 mm. Hg pressure and while tumbling the product continuously, over a period of 4 hours to a SV of 1155 with a content of COOH terminal groups of 21.4 mval./kg. polyester. After the condensation was complete, 400 g. of phenyl glycidyl ether were metered into the evacuated eccentric tumbling drier without altering the condensation temperature, and following thereafter, diffusion and reaction were again carried out in the solid phase for 2½ hours at 235° C., while tumbling the product. After this period, the granular product had a SV of 1135 and a COOH content of 7.9 mval./kg. polyester.

The granular product having modifie dterminal groups was spun in a conventional spinning apparatus consisting of a magazine for the chips, an extruder and a spinneret from a 40-hole spinneret-plate at a rate of 60 g./min. and at a residence time in the extruder and the filtering device of altogether 6 minutes.

The titer of the spun filaments was 1350 d. tex. f. 40. The filaments had a SV of 962 and a content of COOH terminal groups of 3.1 mval./kg. polyester.

The spun filaments were plied five times and drawn in a ratio 1:6.1 in the conventional manner to obtain a filament having a final titer of 1100 d. tex. With these filaments a twist of the construction d. tex. 1100 f. of 200 Z 500 x 2 S 500 was made. This twist was placed between two rubber plates and the test specimen was vulcanized in the press for 45 minutes at 143° C. The rubber mixture had the following composition:

|  | Parts |
|---|---|
| Smoked sheets | 100 |
| SRF-carbon black | 40 |
| Stearic acid | 2 |
| Zinc oxide active | 5 |
| Wood tar | 4 |
| Phenyl-β-naphthylamine | 1 |
| Benzthiazylsulfencyclohexylamide | 0.8 |
| Sulfur | 2.5 |

The vulcanized test specimen was placed in a vessel which could be closed hermetically and which was left for 48 hours at 140° C. in the drier. After this heat treatment, the twist was removed from the test specimen and its breaking strength was tested. In this test, the twist had undergone a loss of strength of only 3.2%.

EXAMPLE 2

Under the same conditions and in the same apparatuses as those described in Example 1, polyester chips were subjected to post-condensation in the solid state. The chips then had a SV of 1163 and a content of COOH terminal groups of 20.9 mval./kg. polyester. These chips were spun, in the same manner as described in Example 1, but without the addition of phenyl glycidyl ether, directly into filaments having a SV of 984 and a content of COOH terminal groups of 29.6 mval./kg. polyester. The filaments were plied, drawn, twisted and subjected to the test in the rubber compound in the manner as described above. After this test, the filaments had undergone a loss of strength of 26.0%.

Thus Example 1 according to the invention shows the great advantage over the method of carrying out the condensation in the solid phase without additional closure of the carboxyl terminal groups.

EXAMPLE 3

After the condensation was complete, a part of the chips, which had been subjected to a condensation in the solid phase in the manner as described in Example 2, was cooled to room temperature and mixed in the eccentric tumbling drier with 1% of phenyl glycidyl ether over a period of 12 hours. After this treatment, the chips had a SV of 1167 and a content of COOH terminal groups of 21.2 mval./kg. polyester. Then the chips were spun in the manner as described in Examples 1 and 2, however, using a 25-hole spinneret plate at a rate of only 30.2 g./mm., whch corresponded to a residence time of 12 minutes. The spun filament had a titer of 840 d. tex. f. 25, a SV of 778 and a content of COOH terminal groups of 4.3 mval./kg. polyester.

The spun filaments were plied 8 times and drawn, twisted and subjected to the test in the rubber compound in the manner as described in Examples 1 and 2. The loss of strength amounted to 15.2%.

Example 3 shows that the chips which had been condensed in the solid phase did not react with the glycidyl ether at room temperature in spite of a long mixing time. Owing to the fact that the residence time in the melt during extrusion and spinning was doubled as compared with that of Examples 1 and 2, there was likewise obtained a considerable reduction of the content of COOH terminal groups, however, it was accompanied by a substantial degradation of the molecular weight. The loss of strength after the test in the rubber compound was much higher than that shown in Example 1 in spite of a comparable content of COOH groups.

EXAMPLE 4

The chips obtained by melt-condensation in the manner as described in Example 1, which had a SV of 950 and a content of COOH terminal groups of 23.6 mval./kg. polyester, were subjected to post-condensation in the solid state under the conditions as described in Example 1, however, over a period of 8 hours, to attain a SV of 1340. After this treatment, the content had sunk to 12.4 mval./kg. The granular product was filled in an atmosphere of nitrogen into an intermediate container and was fed from there into an extruder. To the extruder was connected a double screw extruder provided with mixing chambers from where the melt was passed through a conduit to a spinning aggregate of known construction.

At the point of inlet of the polyester melt into the double screw extruder, phenyl glycidyl ether was simultaneously fed to the polyester melt in a continuous manner by means of a plunger proportioning pump. The rate of through-put of the polyester melt in the installation was 60.4 g./min. the amount of phenyl glycidyl ether added was 0.60 g./min., i.e. approx. 1% of the polyester. The temperature in the melt extruder and in the double screw extruder was 285° C., and in the spinning aggregate it was 295° C. The melt was spun from two filtering devices each having a 25-hole spinneret plate whereby two filament bundles were obtained each having a titer of 840 d. tex. f. 25.

The residence time of the melt in the entire system amounted to 26 minutes, and from the point of inlet of the phenyl glycidyl ether the residence time amounted to 16.5 minutes.

The filaments obtained had a SV of 909 and a content of COOH terminal groups of 3.0 mval./kg. polyester.

Eight of these filaments were plied and drawn, as described in Examples 1, 2 and 3, to 6.1 times their original length to obtain a filament having a titer of 1110 d. tex. The filaments were twisted, vulcanized and subjected to the test in the rubber compound in the manner as described in the foregoing examples. After this test, the twist had lost 8.7% of its original strength as compared with the state prior to vulcanization. This example, which was carried out according to a previously proposed process to obtain COOH closure, shows in comparison with the process of Example 1 according to the invention.

(1) A higher expenditure on apparatus
(2) A much higher degradation of the molecular weight (431 as compared with 193) and
(3) A higher loss of strength when subjected to the test in the rubber compound, in spite of a substantially equal content of COOH terminal groups.

EXAMPLE 5

A polyethylene terephthalate having a SV of 845 and a COOH content of 28.5 mval./kg. was obtained in known manner by condensation in the melt, and chips (4 x 4 x 2 mm.) were chipped off. 40 kg. of these chips were dried in a rotary drier. After drying, the chips were charged to an eccentric tumbling drier, heated in an atmosphere of nitrogen at 230° C., and 480 g. of phenyl glycidyl ether were metered in. The reaction mixture was allowed to react over a period of 4 hours at 230° C. After this treatment, the chips had a SV of 815 and a content of COOH terminal groups of 9.4 mval./kg. polyester. The chips were then melted in an extruder and spun at a residence time of 6 minutes and at a spinning temperature of 290° C. from a 3-hole spinneret at a rate of 308 g./min. The spun monofil was drawn to 4½ times its original length. The monofil had a diameter of 0.5 mm., a SV of 765 and a content of COOH terminal groups of 4.2 mval./kg. polyester.

After a hydrolysis test (92 hours/120° C.) in saturated water vapor, the monofil exhibited a loss of strength of only 9.3%.

EXAMPLE 6

Chips, which had been obtained in the manner as described in Example 5, were allowed to cool after drying, then they were mixed in the eccentric tumbling drier at room temperature with 1.2% of phenyl glycidyl ether over a period of 2 hours. Spinning and drawing into a monofil were carried out in the manner as described in Example 5. After this treatment, the monofil had a SV of 785 and a content of free COOH terminal groups of 21.5 mval./kg. polyester.

After having been subjected to a hydrolysis test analogous to that carried out in Example 5, the monofil had lost 66.5% of its original strength.

Example 6 shows that, when carrying out the process in this manner, the closure of the COOH groups is insufficient on account of the brief normal residence time in the extruder and in the spinneret and that, correspondingly, the degradation and the loss of strength resulting therefrom under hydrolytic conditions are very high as compared to the process of the invention described in Example 5.

We claim:

1. A process for the production of linear polyesters having an improved stability with respect to compounds with active hydrogen comprising reacting the polyesters with ethylene carbonate or monofunctional glycidyl ether in amounts ranging from 0.1% to 10% by weight, calculated on the polyester, said reaction being carried out in a first step with particulate polyester and within a temperature range from 10° to 60° C. below the softening point of the polyester, and thereafter melting the polyester and melt-spinning it.

2. The process of claim 1, in which the reaction is carried out within a temperature range of 15° to 40° C. below the softening point of the polyester.

3. Process for the manufacture of linear polyesters having modified terminal groups as claimed in claim 1, which comprises that the first step of the reaction of the polyester with the ethylene carbonate or with the monofunctional glycidyl ether within a temperature range lying 10° to 60° C. below the melting point of the polyester is carried out following the drying process of the polyester.

4. Process for the manufacture of linear polyesters having modified terminal groups as claimed in claim 1, which comprises that the first step of the reaction of the polyester with the ethylene carbonate or with the monofunctional glycidyl ether is carried out following a post-condensation of the polyester in the solid state.

References Cited

UNITED STATES PATENTS

| 2,723,286 | 11/1955 | Young et al. | 260—485 |
| 2,863,854 | 12/1958 | Wilson | 260—75 |
| 2,863,855 | 12/1958 | Wilson et al. | 260—75 |
| 3,300,447 | 1/1967 | Thoma et al. | 260—75 |
| 3,491,066 | 1/1970 | Petropoulos | 260—75 |

FOREIGN PATENTS 1,139,379  1/1969  Great Britain.

MELVIN GOLDSTEIN, Primary Examiner

U.S. Cl. X.R.

260—75 Ep